Figure 1:
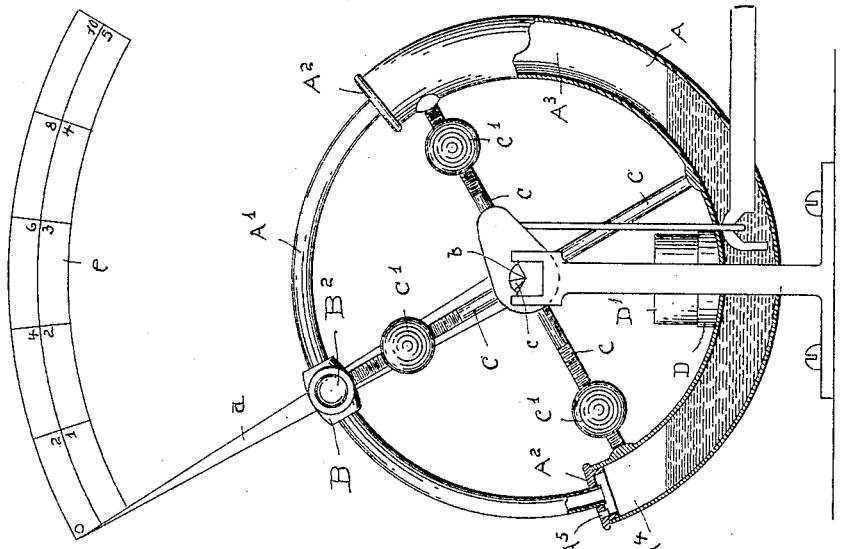

No. 772,090. PATENTED OCT. 11, 1904.
M. A. DUQUETT.
ANTIVIBRATING SCALE INDICATOR.
APPLICATION FILED MAR. 13, 1903.
NO MODEL.

Witnesses—
Eva M. Warren
Grace Cowdrick.

Inventor—
Maxim A. Duquett
By Wilson & Martin
Attorneys

No. 772,090.

Patented October 11, 1904.

UNITED STATES PATENT OFFICE.

MAXIM A. DUQUETT, OF TOLEDO, OHIO.

ANTIVIBRATING SCALE-INDICATOR.

SPECIFICATION forming part of Letters Patent No. 772,090, dated October 11, 1904.

Application filed March 13, 1903. Serial No. 147,584. (No model.)

*To all whom it may concern:*

Be it known that I, MAXIM A. DUQUETT, a citizen of the United States, residing at Toledo, in the county of Lucas and State of Ohio, have invented a new and useful Improvement in Antivibrating Scale-Indicators, of which the following is a specification.

My invention relates to an antivibrating and self-regulating scale-indicator, and has for its object to provide an indicator of the kind that without application of extraneous force or friction moves to and stops at the right indicating-point without vibration.

I accomplish this object by constructing an indicator as hereinafter described, and illustrated in the drawings, in which—

Figure 2:
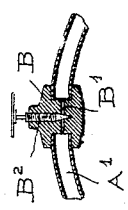
Figure 4:
Figure 3:
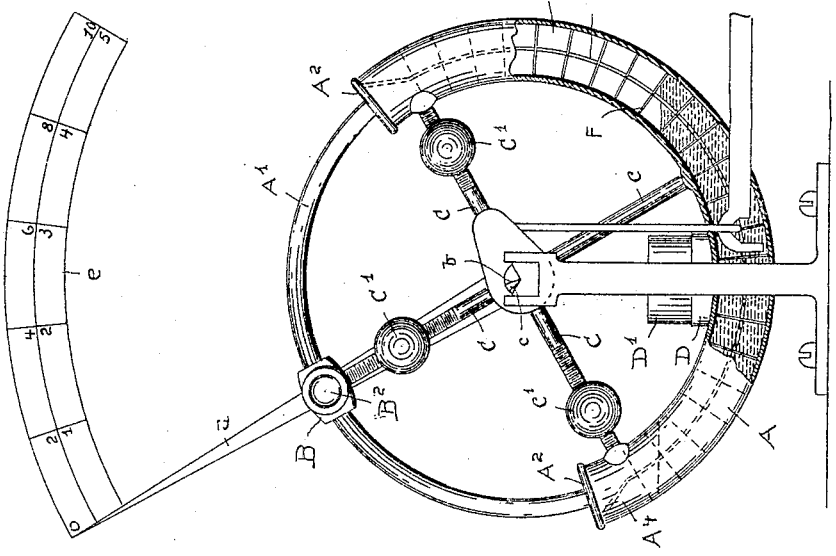

Figure 1 is a part section and part elevation of an oscillating indicator constructed in accordance with my invention. Fig. 2 is a section through the regulating-valve shown in Fig. 1. Fig. 3 shows the tube of the indicator illustrated in Fig. 1 provided with retarding-diaphragms. Fig. 4 is a cross-section of the tube for the liquid, showing a notched diaphragm arranged to retard the flow of the liquid.

In the use of scales articles placed upon the scale-platform give a sudden momentum to the indicator proportionate to the weight of the article that carries it beyond the balancing-point and causes it to vibrate before coming to rest thereon, and to save time in the operation of weighing I have provided a checking mechanism adapted to gradually bring the indicator up to the balancing-point and stop it without vibration.

As applied to a scale in which the indicator $a$ is fulcrumed upon a bearing $b$ by an axle $c$, as shown in Fig. 1, the checking mechanism comprises tube-sections A and A' of differential bore and so bent that when the ends of the smaller tube A' are connected to the closure-caps $A^2$ of the ends of the large tube A there is formed a conduit around the axle as a center with both tube-sections arranged concentric to the axle. Tube A' is provided with a valve-body B, having a port B' and a valve $B^2$ so threaded thereto that the capacity of the opening of the port is readily adjustable. The tube-sections are arranged to move with the indicator and are supported upon a rock-axle $c$ of the indicator by means of radial arms C, which extend from the axle to the tubes and are suitably secured thereto. The arms C are also threaded from near the points of their connection to the tubes toward the axle to receive counterpoises C', and by adjusting the counterpoises on the arms C the checking mechanism may be brought to balance on the indicator-axle $c$. Tube A is provided with a weight-holder D, which is so located that a weight D' placed therein will depress one end of the tube and bring the indicator $a$ to the zero-point of the chart $e$. By partially filling the tube A with a liquid a piston is formed therein which extends an equal distance upward in each direction from the center of gravity to form air-chambers at each end of the large tube A, which are connected by the valved tube A', and of which the chamber $A^3$ at the high end of the tube A when the indicator is at the zero-point exceeds in capacity the chamber $A^4$ at the opposite end of the tube. The liquid piston of the checking mechanism thus constructed and applied to an indicator will when the indicator is moved upon the chart $e$ by an article placed upon the platform rarefy the air in the air-chamber $A^4$ and compress the air in chamber $A^3$, thereby producing an air-cushion therein of increasing resistance adapted to proportionately diminish the momentum of the indicator and by the gradual release of the compressed air through the valve-port B' from chamber $A^3$ into chamber $A^4$ the resistance of the air-cushion is reduced to permit the indicator to gradually attain the balancing-point without overreaching it or vibration, and thereby save time in the use of a scale.

When the indicator is at a standstill at the balancing-point of an article placed upon the platform of a scale, an equilibrium has been restored between the air-chambers, and when the article is removed from the platform the checking mechanism will operate in like manner in the opposite direction to return the indicator to the zero-point of the chart without vibration.

The weight-holder D, which is shown attached to tube A in Figs. 1 and 3 to receive a removable weight D' for returning the indicator to the zero-point of the chart, instead of being so attached may be attached to other points of the scale mechanism, where it will answer the same purpose, and the weighing capacity of the scale may be increased by substituting a heavier weight for the weight D'.

The tube A may be formed continuous around the rock-axle of the indicator and provided with a valve $B^2$ to accomplish the same purpose, as hereinbefore described, and it is manifest that the small-bored valved tube A' may be arranged to connect the air-chambers $A^3$ and $A^4$ in different ways without departing from the principle of my invention. I therefore do not limit myself to the exact form of construction shown.

The liquid forming the piston in the tube A may be placed therein before the closure-caps $A^2$ are secured thereto, or a suitable orifice for introducing the liquid into the tube may be formed in one of the caps $A^2$, as shown in Fig. 3, and after being so introduced the orifice my be closed by a suitable plug $A^5$. The liquid thus inclosed does not evaporate and the piston formed by the liquid remains constant and unchanged in weight.

The tube A (shown in Fig. 1) may be provided with the diaphragms F, as shown in Fig. 3, to retard the flow of the liquid and assist to check the vibration of the indicator. The diaphragms F may be of any suitable number and form adapted to retard the flow of the liquid piston; but, preferably, they are of the form shown in Fig. 4 and are fixedly and centrally mounted at equal intervals on a wire F' of a length to extend from cap to cap central of the tube A. Thus mounted they may be readily inserted in the tube before the caps are secured thereon, which when in position will hold the diaphragms against any movement within the tube.

Without departing from the spirit of my invention the checking mechanism may be detached from the rock-arm of the indicator and so arranged as to be actuated by other moving elements of the scale mechanism, and it may also be readily applied to other mechanism to arrest vibration.

What I claim to be new is—

1. In an antivibrating indicator mechanism for scales, the combination of an armed wheel provided with a differentially-bored rim and so mounted in bearings with the small bore of the rim normally uppermost and connected to a moving part of the scale mechanism as to be rotatably moved thereby; a diaphragm transverse the small bore of the rim; a liquid piston within the large bore of the rim, adapted, when the wheel is rotatably moved in either direction to compress the air in the rim-bore at one side of the diaphragm, and rarefy the air at the opposite side thereof, and a leakage-port through the diagphragm to gradually restore an equilibrium of the air in the divided bores.

2. In an antivibrating indicator for scales, the combination of an indicator having a rock-axle fulcrumed in bearings and provided with operating mechanism; with a differentially-bored tubular conduit arranged to encircle and rock with the axle and balance with the indicator, with the small bore of the conduit disposed above the axle and provided with a dividing-diaphragm; a liquid piston within the large bore of the conduit, adapted when the conduit is moved with the indicator to compress air in the conduit at one side of the diaphragm and rarefy the air at the opposite side of the diaphragm; and a controllable port in the diaphragm adapted to gradually equalize the pressure of air in the chambers.

3. In an antivibrating indicator for scales, the combination of an indicator having a rock-axle fulcrumed in bearings and coupled to operating mechanism, with a balanced tubular conduit arranged to concentrically encircle and move with the axle and provided with a diaphragm to divide the bore above the axle; a liquid piston within the bore of the conduit adapted when the conduit is moved with the indicator to compress the air in the conduit at one side of the diaphragm and rarefy the air at the opposite side thereof, and a port through the diaphragm provided with a controlling-valve, adapted to gradually release compressed air from one chamber into the opposite chamber.

4. In an antivibrating indicator for scales the combination of an indicator having a rock-axle fulcrumed in bearings and provided with operating mechanism with a conduit closed at both ends and arranged partially around and concentric to the axle; a liquid piston adapted to form separate air-chambers at the ends of the conduit; a valve-controlled duct arranged to connect both air-chambers; arms extending from the rock-axle to support the conduit and rock the conduit with the indicator; adjustable counterpoises mounted on the arms to balance the conduit with the indicator at the zero-point of the scale.

5. In an antivibrating indicator for scales, the combination with an indicator mounted on a rock-axle coupled to an operating mechanism, of a sectional tubular conduit arranged to concentrically encircle and rock with the indicator-axle, one section of the conduit having a greatly-reduced bore; a liquid piston within the large bore of the conduit; and obstructions in the conduit transverse the piston adapted, when the conduit is rocked, to retard the flow of the liquid piston therein.

6. In an antivibrating indicator for scales, the combination with an indicator mounted on a rock-axle, of a sectional tubular conduit arranged to concentrically encircle and rock with the indicator-axle, one section of the conduit having a greatly-reduced bore; a liquid piston within the large bore of the conduit, and one or more notched diaphragms within the conduit transverse the liquid piston.

7. In an antivibrating indicator mechanism for scales, the combination with an indicator mounted on rock-bearings, of an armed wheel provided with a tubular rim, one section of which is provided with a greatly-reduced bore, the wheel being mounted on the rock-bearings of the indicator with the rim-section having reduced bore uppermost, and a liquid piston in the large bore of the rim.

8. In an antivibrating indicator mechanism for scales, the combination with an indicator mounted on rock-bearings, of an armed wheel provided with a tubular rim, one section of which is provided with a greatly-reduced bore, the wheel being mounted on the rock-bearings of the indicator with the rim-section having reduced bore uppermost, a liquid piston in the large bore of the rim, and means to balance the wheel on the rock-bearings.

9. In an antivibrating indicator mechanism for scales, the combination with an indicator mounted on knife-bearings, of a semiannular closed tube concentrically and pendulously mounted on the bearings, a leakage-duct connecting the closed ends of the semiannular tube, and communicating with its bore, and a liquid piston in the semiannular tube.

10. In an antivibrating indicator for scales, the combination with an indicator mounted on a rock-axle, of a tubular conduit arranged to concentrically encircle and rock with the indicator-axle, a diaphragm transverse the bore of the conduit, a liquid piston in the conduit adapted to compress the air in the conduit on one side of the diaphragm and rarefy it on the other when the indicator is moved in either direction, and a leakage-port in the diaphragm, adapted to restore an equilibrium of the air in the conduit.

In witness whereof I have hereunto set my hand this 3d day of March, A. D. 1903.

MAXIM A. DUQUETT.

Witnesses:
WILLIAM H. MOOR,
LAURA YOUNGS.